(12) United States Patent
Nunez Hughes et al.

(10) Patent No.: US 11,297,776 B2
(45) Date of Patent: Apr. 12, 2022

(54) MULTIPLE-CONE IMPLANT FOR PLANT SPECIES

(71) Applicants: Dennis Elias Nunez Hughes, Bogota (CO); Jesus Octavio Puyana Morantes, Bogota (CO)

(72) Inventors: Dennis Elias Nunez Hughes, Bogota (CO); Jesus Octavio Puyana Morantes, Bogota (CO)

( * ) Notice: Subject to any disclaimer, the term of this patent is extended or adjusted under 35 U.S.C. 154(b) by 1021 days.

(21) Appl. No.: 15/770,771

(22) PCT Filed: Sep. 23, 2016

(86) PCT No.: PCT/IB2016/055679
§ 371 (c)(1),
(2) Date: Apr. 25, 2018

(87) PCT Pub. No.: WO2017/072608
PCT Pub. Date: May 4, 2017

(65) Prior Publication Data
US 2018/0310487 A1    Nov. 1, 2018

(30) Foreign Application Priority Data

Oct. 27, 2015   (CO) .................................... 15-256357

(51) Int. Cl.
*A01G 7/06*        (2006.01)
(52) U.S. Cl.
CPC ..................................... *A01G 7/06* (2013.01)

(58) Field of Classification Search
CPC .......... A01G 7/06; A01G 17/18; A01G 23/13; A01G 23/10; A01G 27/00; A01G 29/00; A01M 17/002
See application file for complete search history.

(56) References Cited

U.S. PATENT DOCUMENTS

| 1,937,172 A | * | 11/1933 | Starner | ................... | A01G 29/00 |
| | | | | | 111/7.1 |
| 2,116,591 A | * | 5/1938 | Barber | ..................... | A01G 7/06 |
| | | | | | 47/57.5 |

(Continued)

FOREIGN PATENT DOCUMENTS

| CA | 1096637 A | * | 3/1981 | ............. | A01G 23/10 |
| CA | 2357128 A1 | * | 3/2002 | ............. | A01G 29/00 |

(Continued)

*Primary Examiner* — Magdalena Topolski
(74) *Attorney, Agent, or Firm* — Hoglund & Pamias, PSC; Roberto J. Rios (57) ABSTRACT

A multiple conical implant with its accessories is provided to introduce agents in a vegetal body used for treatment of trees and plants. A cannula conical implant for endotherapy in plants is made of plastic or other biocompatible, innocuous material and susceptible of being sterilized. The multiple conical implant may be adapted to any irrigation systems of low pressure whether by gravity or by external sources of energy. The implant includes a permanent and hermetic access through a main body with a conical nozzle with access to a helical hole and a fastening nut with a connector body with protrusions of two cones formed by a herringbone inverted shape and its own fastening nut with two inner diameters to couple the conical end of a hose, the connector body with protrusions and the main body.

6 Claims, 9 Drawing Sheets

(56) References Cited

U.S. PATENT DOCUMENTS

| | | | | |
|---|---|---|---|---|
| 2,874,657 | A | * | 2/1959 | Austin .................... A01G 29/00 111/7.1 |
| 3,608,239 | A | * | 9/1971 | Tucker ..................... A01G 7/06 47/57.5 |
| 3,774,556 | A | * | 11/1973 | Poll ..................... A01M 17/002 111/7.2 |
| 3,834,075 | A | * | 9/1974 | Nix .......................... A01G 7/06 47/57.5 |
| 3,864,874 | A | * | 2/1975 | Norris ..................... A01G 7/06 47/57.5 |
| 4,651,468 | A | * | 3/1987 | Martinez ................ A01G 27/00 47/48.5 |
| 5,771,930 | A | * | 6/1998 | Visk ....................... A01G 29/00 111/7.4 |
| 6,243,986 | B1 | * | 6/2001 | Crowley .............. A01G 27/006 47/48.5 |
| 6,311,429 | B1 | * | 11/2001 | Wolfe ...................... A01G 7/06 47/11 |
| 6,585,702 | B1 | | 7/2003 | Brunel |
| 8,671,614 | B1 | * | 3/2014 | Doolittle ................ A01G 29/00 47/57.5 |
| 8,677,684 | B1 | * | 3/2014 | Doolittle .................. A01G 7/06 47/57.5 |
| 2002/0157307 | A1 | | 10/2002 | Brown |
| 2003/0159630 | A1 | * | 8/2003 | Rollins ............... A01M 17/002 111/7.4 |
| 2005/0166450 | A1 | * | 8/2005 | Wild ........................ A01G 7/06 47/57.5 |
| 2007/0033870 | A1 | * | 2/2007 | Burgess ................... A01G 7/06 47/57.5 |

FOREIGN PATENT DOCUMENTS

| | | | | |
|---|---|---|---|---|
| CH | 147360 | A | * 6/1931 | .......... A01M 17/002 |
| EP | 0305622 | A1 | * 3/1989 | ............. A01G 29/00 |
| KR | 100849863 | B1 | 8/2008 | |
| WO | WO-2011148026 | A1 | * 12/2011 | ............... A01G 7/06 |
| WO | WO-2015133721 | A1 | * 9/2015 | ............... A01G 7/06 |

* cited by examiner

MULTIPLE-CONE IMPLANT FOR PLANT SPECIES

TECHNOLOGICAL SECTOR

The present invention is a device with its corresponding accessories to introduce agents in a plant body used for treatment of trees and plants during their growth, specifically consisting of a cannula conical implant for endotherapy in plants made of plastic or other biocompatible, innocuous material and susceptible of being sterilized which provide measurable and controllable doses in a continuous and constant flow of nutritive, phytosanitary substances, agricultural supplies, pesticides, bactericides, fungicides and acaricides; the multiple conical implant may be adapted to any irrigation systems of low pressure whether by gravity or by external sources of energy; it includes a permanent and hermetic access mean to secure, measure and control the hydric and gas flow of solutes directly accessing the circulation and distribution channels of the plant, xylem and phloem, contributing to execute nutritive, preventive and healing process in cases of disease, plagues, nutritional or water lacks through a main body with a conical nozzle with access to a helical hole and a fastening nut with a connector body with protrusions of two cones formed by a herringbone inverted shape and its own fastening nut with two inner diameters to couple the conical end of a hose, the connector body with protrusions and the main body.

STATE OF THE ART

Endotherapy in plants is a method of alternative treatment for the palliative, precise and temporary care of plants, which is rarely used and characterized by the perforation of one or several zones of the trunk to the xylem and/phloem and then by the introduction of a needle and/or injection to provide fluids.

Then, both the injection as the insertion point are covered with a mass or product stimulating sealing and disinfection to protect the perforated section.

The administration of fluids is made with short doses and volumes and in a palliative, precise and temporary manner in an acropetal direction and then the needle, screws and/or injection is removed; the hole is left open to allow the scarring and/or sealing process with a product for such purpose. It is highlighted that some existent pieces may be considered rudimentary and they have pathogen or contaminant elements. Likewise, in the most of the cases they need masses, sealers and/or components external to the plant to allow its coupling.

With endotherapy benefits such as reduction of a negative impact for the environment and people that may have direct or indirect contact with some chemical compounds applied to species for phytosanitary care are obtained; it focuses on treatment and allows control regarding quantities and doses provided to the plant.

According to the investigations made, it is important to say that there are three type of vegetal endotherapy systems: By gravity with holes, of 4 mm diameter in a height of 8 dm-10 dm from the tree's base, every 3 to 4 dm. Pressure of injection is 0.2 bar and injection times range between 20 minutes to 24 minutes. By micropressure with holes in the plant that range from 4 mm diameter in the tree's neck, every 12 cm-15 cm with an injection pressure of 0.5 bar and injection times of 20 minutes to 24 hours. By pressure where holes are from 3.5 to 6 mm diameter and made in a height of 8 dm to 10 dm on the trees' base and every 3 cm to 4 cm with a pressure of 2.5 and 8 bar and injection times from 3 minutes to 30 minutes.

There are different systems with greater invasion and risk, such as pistols with slotted needles passing through the whole stem and applying a determined quantity of liquids and drugs to the plant and the removed leaving the hole exposed in the plant's stem and tissue such as patent Japanese knotweed injector system US 20070033870 A1. While the new application has a hermetic sealing which protects the hole. Application of Mexican patent "Single use injection device" PA/A/2002/003479 is a solution proposing a syringe with less than two extensible legs radially adapted to cover the protection cap of syringe and supplied with at least one internal grip for the cap; which differs from this application which has no additional legs and it has a hermetic sealing with the coupling nut.

Applications "Plant injection method and apparatus" US U.S. Pat. No. 2,116,591 and application "Hermetic pressure type tree injection device for injecting a tree with a liquid chemical using a compression container and bellows container" with the Korean application number 1020070066758, make the injection with chemical contents to the plant by compression. The new device does not inject by compression but by irrigation through a helical slot of the introduced body end and it has no rupture membranes such as background 1020070066758.

Patent "Injection Pick For Dosing Systemic And Nutritional Products Into Trees And Palmaceae" PCT/ES2011/070377 and patent US20050166450 "Injection needle for injecting woody plants" are tubular complete and sharp bodies, while this new applications has an accessory of join with the nut for maintenance and reuse, without stoppers, spikes and fastening rings. It solves the problem of using stoppers with double inverted cone accessories allowing fluids access and connection with the upper section of the connector body which due to its inverted herringbone shape makes the physical dilatation or expansion producing a sealing between pieces, avoiding flows and leaks, finally, along with the nut it allows the sealing.

US2002157307 "Perforated hollow spike for introducing a water soluble compound into a tree's vascular system" has a spike consisting of a hollow body to store a water soluble compound a pointed end and holes near to the end to insert the compound into the three's vascular system; the new application has a conical body with helical hole and a connector body with a nut coupling.

U.S. Pat. No. 6,311,429 "Tree implant device" is a device to be inserted through a hole in the tree's trunk with a hollow long body, two winged elements in opposite sides of the body, a cone-shaped end and two flexible protrusions on the opposite sides of the body and "U" shaped openings. The new application has a conical body with helical hole and a connector body with a nut coupling formed by a single integral body with a conical nozzle with access of helical hole and fastening nut, a connector body with protrusions of two cones formed by the shape of an inverted herringbone and its own fastening nut with two inner diameters to couple the conical end of a hose, the connector body with protrusions and the main body.

Application U.S. Pat. No. 4,651,468 "Method and apparatus for natural fertilization and irrigation of plants" is adapted to be inserted in the tree's outer layers and consisting of a ring with an expansive sealing element and a second member moving to the sealing element to expand it and avoid air filtration. On the other hand, patent application U.S. Pat. No. 3,864,874 "Method And Apparatus For Introducing A Fluid Into The Vascular System Of A Tree Or Similar Plant" also consists of an implant capsule inserted into a hole of the tree, where the capsule consists of openings in the cylindrical walls connected to the tree's sap flow and the treatment fluid is introduced into the tree by inserting a hypodermic needle through the capsule's holes. The new application is also by irrigation with a new solution of conical body with helical hole and a connector body with a coupling nut formed by a single body without a sealing expansive element and without extending the introduced body, it also has its own connector body with protrusions of two cones formed by the shape of an inverted herringbone for the hose.

Any of the known backgrounds presents solutions such as the characteristics of the device of this application, the new application with cone, its design and angles are necessary to create a hermetic sealing between the implant and the receptor body due to only to the physical force and friction generated.

It can be seen that U.S. Pat. No. 4,651,468 "Method and apparatus for natural fertilization and irrigation of plants" is a permanent implant for endotherapy in trees, which insert body is formed by a cylindrical ceramic body with a porous surface, but such solution has no conical body with a helical hole and fastening nut creating a hermetic sealing for the hole made to the tree. In addition, the coupling nut allow the present invention joining in an easy and safe manner to the chemical distribution systems. The specific configuration of the implant body of this technology has its own nut and it has four independent pieces that have a technical advantageous effect which is not possible with devices of the previous art of the combination of them; besides each independent body is made of a different material for elasticity, airtightness, rigidity and to comply with every specific function.

DESCRIPTION OF INVENTION

The multiple conical implant is a cannula element which incorporates into the plant permanently, it is not a needle, or injection; it installation requires no ointments, creams, bacteria, adhesion and/or scarring allergens, since its design has an hermetic sealing by physical force and an antibacterial adhesion effect regarding its components to the tree's or plant's trunk where is it put, without any limits of time; unlike other devices, systems or apparatus. Upon its installation it provides a continuous flow without limit of time and available when required, without the need of making other perforations.

Implant design allows forming a main body with a conical nozzle with Access to the helical hole and a fastening screw, a connector body with protrusions of two cones formed by an inverted herringbone shape and its own fastening nut with two inner diameters to couple the conical end of a hose, the connector body with protrusions and the main body. Upon its installation the implant allows making a hermetic sealing by low force physical pressure, its adjustments does not require any special sealants or attachments. Implant allows the fluid absorption by the plant's vessels, without requiring external stimulation and with no fluids return. Implant allows dosing and controlling fluids provided by the plant with a poly-functional technology, it allows applying different types of compounds from supplies, pesticides, solutes, fluids and gas under the same pressure system determined without leaks, filtrations or returns.

Implant manipulation and structure may be easily detachable, biocompatible and reusable with an easy application and adaptation to traditional irrigation systems, at "switching cost".

Implant allows a practical installation, it does not require specialized personnel for its manipulation, adaptation and/or maintenance; in case of any problems, it may be detached, revised and its components may be partially or totally replaced. The structure of the extensor structure allows making an irrigation in different points of the xylem and phloem simultaneously, without requiring multiple holes; it provide a wide plant's absorption and pressure of turgor.

Implant introduces solutes and raw substances through the implant sub-components to the plant's distribution channels.

Adjust of pieces or sub-components is mechanical, with an easy configuration, replacements and it does not require attachments or welding to connect parts. Implant allows reducing the water print, it eliminates the environmental implant generating external applications on the fauna and flora, air, water, soil, micro flora, micro fauna and the ecosystem in general.

Implant avoids contact with particles and/or inhalation of highly hazardous supplies and/or toxicity that should be manipulated by authorized personnel or that are carried to the habitat of other living beings, decreasing the direct and/or indirect negative environmental impact and risks of occupational health.

TECHNICAL DESCRIPTION AND FIGURES

The invention is a cannula conical implant for endotherapy in plants made of plastic with a main body with a conical nozzle with access of helical hole and fastening nut, a connector body with protrusions of two cones formed by the shape of an inverted herringbone and its own fastening nut with two inner diameters to couple the conical end of a hose, the connector body with protrusions and the main body which is better described with the following figures.

Figure 1:
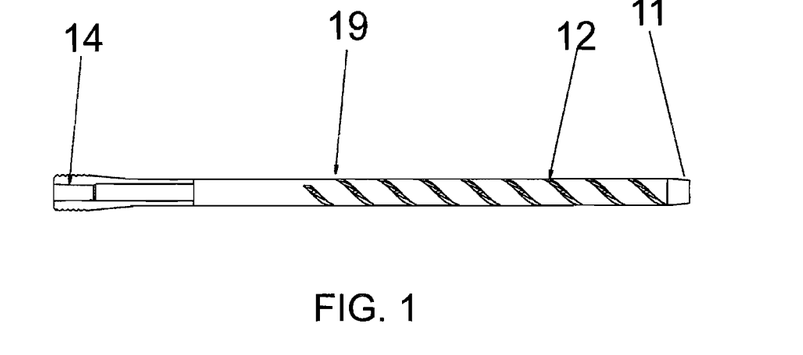
FIG. 1 shows the main body of conical nozzle with access of helical hole and nut with view to the inner of head.
Figure 2:
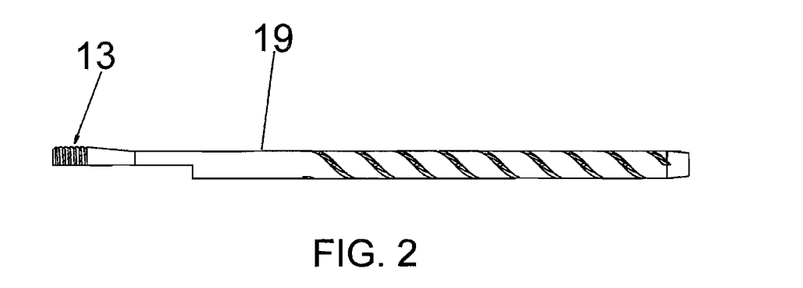
FIG. 2 shows the main body of conical nozzle with access of helical hole and nut with side view of head.
Figure 3:
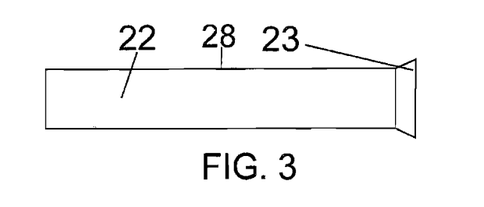
FIG. 3 shows the side view of the hose.
Figure 4:
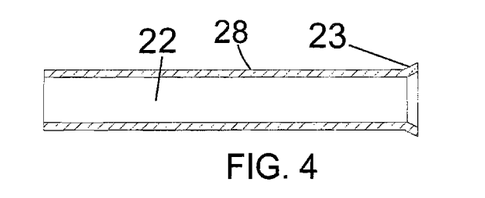
FIG. 4 shows a view of the hose.
Figure 5:
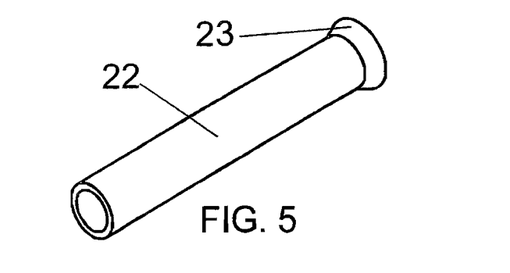
FIG. 5 shows a perspective of the hose.
Figure 6:
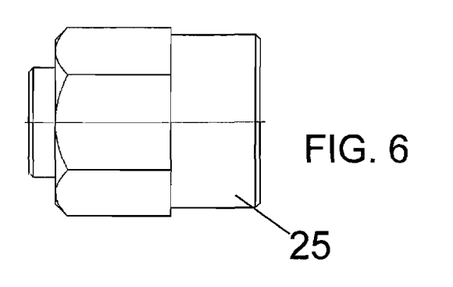
FIG. 6 shows the side view of the fastening nut.
Figure 7:
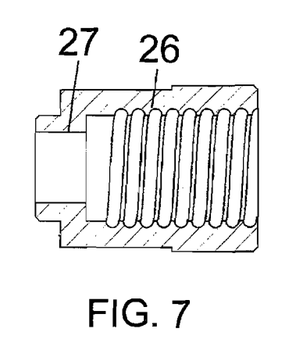
FIG. 7 shows a view of the fastening nut.
Figure 8:
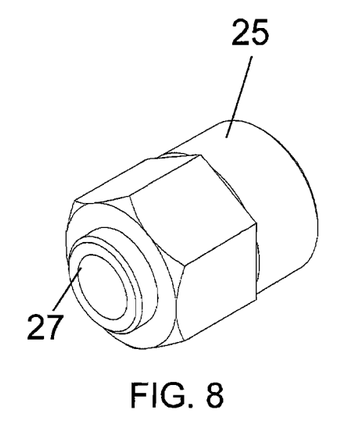
FIG. 8 shows a perspective of the fastening nut.
Figure 9:
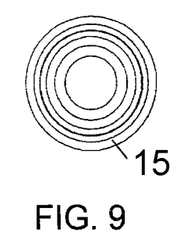
FIG. 9 shows a side view of the connector body with protrusions of two cones.
Figure 10:
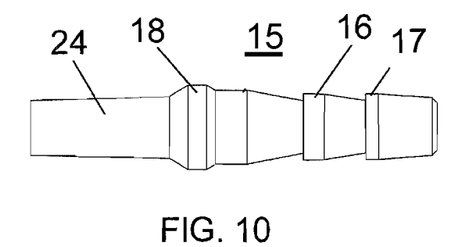
FIG. 10 shows a view of the connector body with protrusions of two cone.
Figure 11:
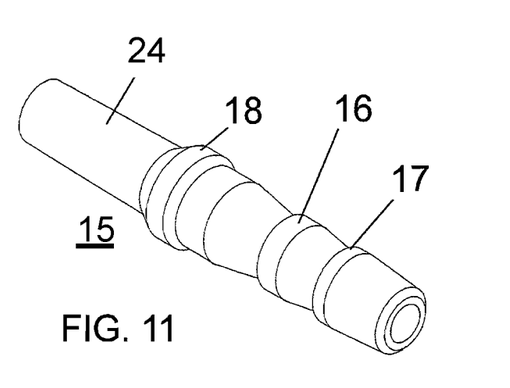
FIG. 11 shows a perspective of the connector body with protrusions of two cones.
Figure 12:
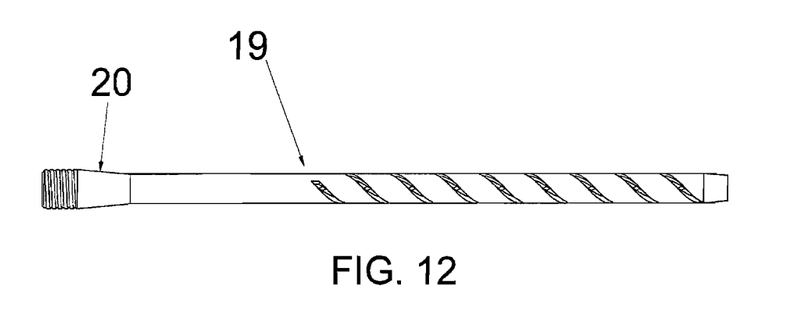
FIG. 12 shows the main body with a conical nozzle with access of helical hole.
Figure 13:
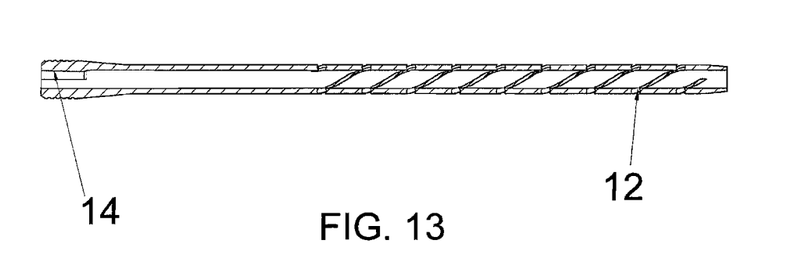
FIG. 13 shows a longitudinal view of the main body of conical nozzle with access of helical hole and nut.
Figure 14:
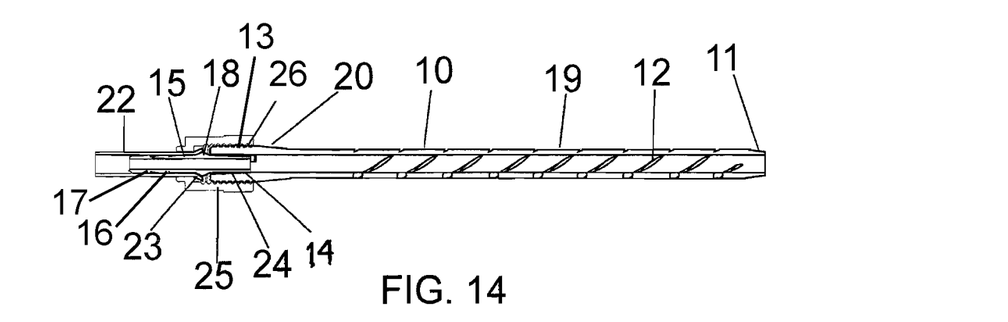
FIG. 14 shows a longitudinal view of the assembly for the main body of conical nozzle with access of helical hole, coupling nut, hose and connector body.
Figure 15:
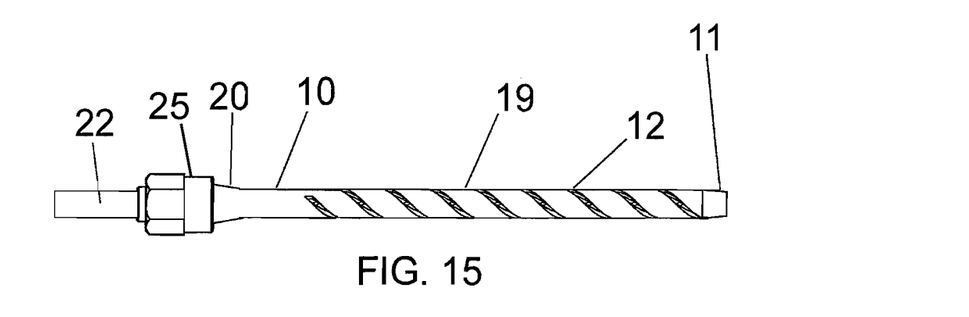
FIG. 15 shows the assembly for the main body of conical nozzle with access of helical hole, coupling nut, hose and connector body.
Figure 16:
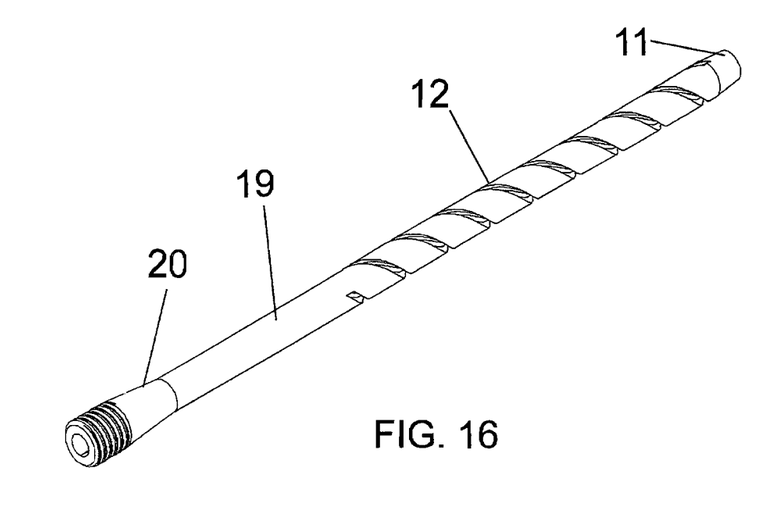
FIG. 16 shows a perspective of the assembly for the main body of conical nozzle with access of helical hole, coupling nut, hose and connector body.
Figure 17:
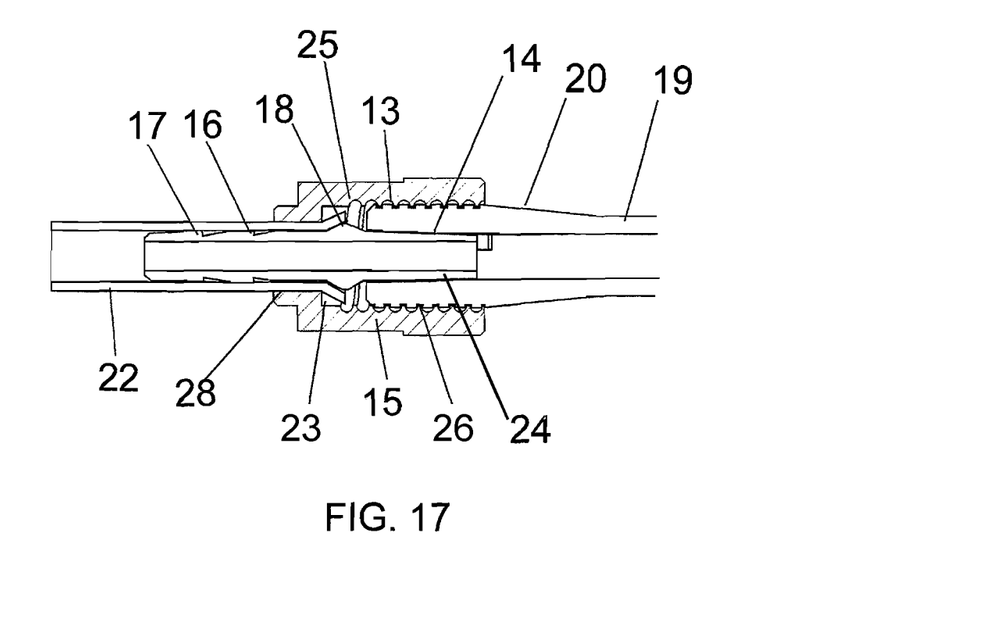
FIG. 17 shows in the detail the assembly for the main body of conical nozzle with access of helical hole, coupling nut, hose and connector body.
Figure 18:
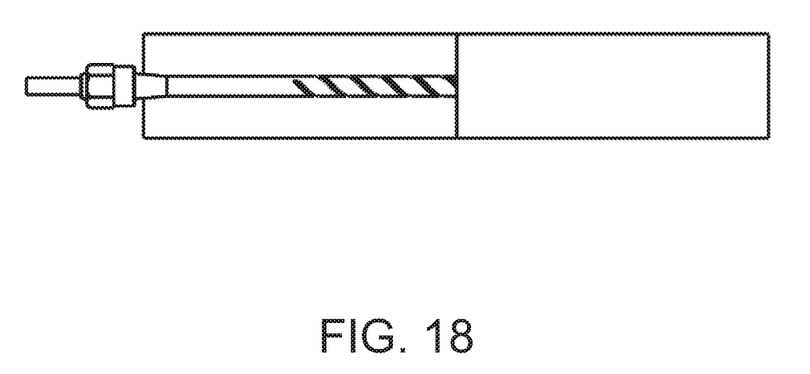
FIG. 18 shows the hermetic coupling and stability produced by the conical shape of the implant.

The conical implant (10) consists of a main body (19) of the outer conical chisel tip (11) to access the plant, section of helical hole tube (12) to enter and incorporate the material, an outer fastening nut (13) in the opposite end to the conical tip (11) and an inner conical section (14) to couple the connector body (15) with the hose protrusions (18) and protrusions of two cones (16) y (17) formed by the shape of an inverted herringbone. The main body (19) of the outer chisel tip (11) has a section of tube with slotted holes in lineal, regular and/or irregular shapes; or with regulars and/or irregular polygonal non-continuous slots.

Invention can be made with type of holes, not only helical ones, such as slots and other lineal and/or regular and/or irregular polygonal non-continuous lines; but the preferred form is the section of helical hole tube (12) to enter and incorporate the material.

For the use of the main body (19) there is an outer chisel conical tip (11) in a hole of the plant making a sealing with the plant's stem whether monocotyledon or dicotyledon plants through the pressure of the main body (19) until entering the end of the outer conical section (20) next to the threaded section (13). The connector body (15) has a tapered shape with a flat outer conical section (24), a hose protrusion (18) for blocking the funnel tip (23) of the hose (22) and protrusions of two cones (16) and (17) formed by the inverted herringbone adjusting the hose inner walls (22); where the flat outer conical section (24) of the connector body (15) couples with the inner conical section (14) under the outer fastening thread (13) of the main body (19) by adjustment of the nut (25) over the outer fastening thread (13) which fastens in the inner threaded section (26), which joins the pieces and their seal.

The connector body (15) receives its upper part, on the protrusions of two cones (16) and (17) the hose (22) of the access flow, which, through the section of inverted herringbone has a first fastening and dilatation which is complemented in the sealing by moving and tightening the nut (25).

The fastening nut (25) of the hexagonal head with two inner diameters to couple the funnel tip (23) of the hose (22), has an inner threaded section (26) to receive the outer fastening thread (13) of the conical tip (11) and it has a shorter tubular section (27) to adjust the funnel tip (23) of the hose (22) to form a seal when tightening the pieces with the connector body (15) mounted. The nut (25) has the function of fastening, making pressure and sealing the connector body (15) and the hose (22) of flow in its upper part, eliminating the possibility of leaks or foreign bodies' entry.

The hose (22) has a tubular section (28) and ending in the funnel tip (23) of flexible material for the fluids entering; which connects to the upper part of the connector body (15) which when coupling to the inverted herringbone of the tubular section inner walls (28) allows the physical dilatation or expansion producing a sealing between the pieces, avoiding backflow and leaks, and finally, along with the nut (25) it causes the sealing.

As a result, the conical implant (10) with its cone, design and angles make a hermetic sealing between the implant and receptor body of the plant due to only to the physical force and friction generated.

The invention claimed is:

1. A multiple conical implant to introduce pure agents of solutes and substances through the implant to the plant's distribution channels, said multiple conical implant comprising:
   a main body (19) having an outer conical chisel tip (11) on one end, an outer fastening thread (13) with an inner conical section (14) on an opposite end, and a section of perforated tube between both ends;
   a connector body (15) with a hose protrusion (18) and two cone protrusions (16,17) formed as an inverted herringbone shape, said connector body (15) having one end configured to be coupled to said inner conical section (14);
   a fastening nut (25) of hexagonal head having a first diameter with a section of inner thread (26) configured to receive the outer fastening thread (13) and a having a second diameter with a tubular section (27), wherein said second diameter is smaller than said first diameter; and
   a connection hose (22) having a flat tubular section (28) and a funnel tip (23) on an end thereof configured to introduce fluids, wherein said fastening nut (25) forms a sealing between the main body (19) and the connection hose (22) when tightened with said connector body (15) within said main body (19) and said connection hose (22).

2. The multiple conical implant according to claim 1, wherein the main body (19) has an end of outer conical section (20) next to the threaded section (13) and said inner conical section (14) is provided under the outer fastening thread (13).

3. The multiple conical implant according to claim 1, wherein said connector body (15) has a flat tapered-shaped outer conical section (24) configured to be coupled with the inner conical section (14) of the main body (19) to form the sealing between the main body (19) and the connection hose (22) by tightening the external fastening thread (13) with the section of inner thread (26) of said fastening nut (25).

4. The multiple conical implant according to claim 1, wherein said two cone protrusions (16,17) are configured to be inserted within the flat tubular section (28) to expand said connection hose (22) forming a sealing between said two cone protrusions (16,17) and inner walls of said flat tubular section (28), said sealing being complementary to the sealing formed by said fastening nut (25).

5. The multiple conical implant according to claim 1, wherein said hose protrusion (18) blocks the funnel tip (23) when the fastening nut (25) is tightened.

6. The multiple conical implant according to claim 1, wherein said section of a perforated tube comprises a helical perforated tube (12).

* * * * *